United States Patent Office 2,874,080
Patented Feb. 17, 1959

2,874,080

SELF-HARDENING SURFACE COATING COMPOSITIONS

Otto Schweitzer, Frankfurt am Main, and Erich Bäder, Hanau am Main, Germany, assignors to Deutsch Gold- und Silber-Scheideanstalt vormals Roessler, Frankfurt, Germany No Drawing. Application July 13, 1954
Serial No. 443,084

Claims priority, application Germany July 18, 1953

21 Claims. (Cl. 148—6.14)

This invention relates to self-hardening surface coating compositions.

It is known to produce self-hardening surface coating compositions such as adhesives, cements, trowelling masses and lacquers from polymerising substances or mixtures containing the latter, which on hardening form polyethylene compounds, polystyrene compounds, the so-called polyester resins, or resins derived from isocyanates and polyurethanes. In this connection it is advantageous to use substances which polymerise rapidly even at room temperature under the action of catalysts. Such catalysts are, for example, redox systems, which contain a tertiary amine, α-amino-sulphone or α-hydroxy-sulphone. Mixtures which consist of polymerisable compounds and polymerised compounds are also frequently used as binding agents. Such adhesives, cements, trowelling masses and lacquers may also contain the conventional fillers, pigments and plasticisers as well as the binding agent proper.

In general, these mixtures of substances have proved exceptionally satisfactory. It was only when they were applied to copper and its alloys or zinc and its alloys that occasionally a bond of comparatively low strength was observed, which makes it difficult to use them, for example, for bonding metals.

It has now been found that the strength with which such substances or mixtures of substances adhere to copper, zinc and their alloys may be substantially improved if the mixtures have added thereto small quantities of such compounds as form complex compounds with copper or zinc. These complex formers include enolisable acetone derivatives, such as, for example, acetyl acetone or benzoyl acetone. Hydroxy-quinolines, for example, form another group of complex formers.

Accordingly the present invention provides a self-hardening surface coating composition for example an adhesive, cement, trowelling mass or lacquer, suitable for application to copper, zinc or an alloy thereof, comprising one or more polymerising substances and a minor proportion of a compound which forms a complex compound with copper or zinc.

It has further been found that adhesives, cements, trowelling masses and the like, harden without wrinkling, without external influences and even with exclusion of air, if they contain at least one monomeric polymerisable compound, at least one wholly or partially polymerised compound and, as catalyst, at least one peroxide compound and at least one tertiary amine or one α-amino-sulphone or one α-hydroxy-sulphone. Such mixtures harden in a very short time and represent adhesives, cements, trowelling masses and the like of exceptional adhesive strength.

As the monomeric polymerisable compound, it is advisable to use an organic compound which contains the terminal group —CH=CH$_2$, as for example monomeric styrene. A polymerised vinyl compound, for example, polystyrene, may be successfully employed as the wholly or partially polymerised compound. The wholly or partially polymerised compound is advantageously mixed with or dissolved in the monomeric compound at the time of use or just prior thereto.

Mixtures capable of being used satisfactorily may contain one or more α-β-unsaturated polyester resins. In general it is sufficient if these polyester resins are added in quantities of less than 30%, preferably 5–15%. If the proportion added is higher, the adhesive power of the mixture frequently decreases. In place of or in addition to the polyester resins, maleic acid anhydride may also be employed with the same success. The addition of these substances favourably influences the polymerisation velocity.

The adhesive strength of the mixtures may be further improved by the addition of comparatively small quantities of hydrophilic organic compounds having terminal $CH_2=C<$ groups, such as acrylic acid, methacrylic acid, acrylic acid amide, methacrylic acid amide or polymers thereof.

The addition of acrylic acid further facilitates the complete intermixing of the monomeric and polymeric compounds. Moreover, the separation of the mixture into its components which sometimes occurs when an acrylic acid alkyl ester, for example, acrylic acid butyl ester, is present, is prevented by the addition of a hydrophilic substance, such as acrylic acid.

The said constituents may be added in different ratios each according to the purpose of use. A mixture which contains 60 to 100 parts of the polymer to 100 parts of the monomer is suitable for bonding metals. The proportion of polymer is expediently increased for the production of cementing masses.

Moreover, as the polymerising substances, it is possible to employ polyisocyanates, condensation products of diisocyanates with dialcohols, diamines or diamides, alkylene oxides, cyanosorbic acid esters or other compounds. These substances may be used alone or in admixtures with one another, it being possible in certain cases to employ fully polymerised constituents which are dissolved in a monomer, or initially polymerised constituents.

In order to improve the elasticity and softness, the mixtures may also have added thereto so-called internal plasticisers. Suitable internal plasticisers include monomeric compounds which produce soft polymers and are compatible with styrene, such as, for example, decanol vinyl ether and higher esters of acrylic acid and methacrylic acid. Similar effects are produced by addition of the corresponding polymers. Furthermore, polyvinyl methyl ether and polyvinyl ethyl ether, for example, are also suitable. The mixtures may also contain cross-linking agents, such as divinyl benzenes, and other hardening monomers, for example, methyl methacrylate or p-dichlorostyrene.

Among the peroxide compounds acting as catalyst particular reference may be made to benzoyl peroxide, which causes very rapid thorough hardening in combination with tertiary amines, for example, diethanol-p-toluidine. The same result is produced if the tertiary amine is completely or partially replaced by α-aminosulphone or an α-hydroxy-sulphone.

Further improvements in the hardening may be produced by the addition of comparatively small quantities of inorganic or organic compounds which contain a labile halogen atom, by the addition of monohydric or polyhydric alcohols or of small quantities of heavy metal salts.

The mixtures to be applied may have added thereto other additives which are known per se for coating media.

such as pigments, fillers, resins, cellulose compounds, plasticisers and oils.

Mixtures of the said type can be used with outstandingly successful results for bonding substances of a wide variety of types. They may be used with greatest success for bonding substances which are impermeable to gas, for example, metals or glass. They are also exceptionally suitable for sealing off joints and cracks in motor vehicles, aircraft and the like or for cementing glass or safety panes in place. The thermoplastic behaviour of the mixture renders it possible for the glass to be easily removed again by heating the cement. Furthermore, such mixtures may also be used for the manufacture of synthetic wood or for correcting faults in wood. The mass is readily deformable after being mixed and may easily be machined by planes, saws and the like after hardening.

It has further been found that the reacting substances or mixtures of substances may first be brought together at the place of application. Preferably those components of the mixtures of substances which react with one another are applied in a suitable proportion to the place of application from different containers.

In a further development of the invention, it has further been found that good results are obtained if the binding agent proper, on the one hand, and the catalyst, on the other hand, are only brought together in suitable proportions at the place of application. A polymerising substance or a mixture of such substances can be used with particularly good results in this case as binding agent. For example, a paste-like mixture of a polymerising substance with a monomeric organic compound having the terminal group —CH=CH$_2$ may be used as binding agent. By way of example there may be mentioned a mixture of monomeric styrene with partially polymerised styrene or a mixture of monomeric methyl methylacrylate with the polymerised ester. It is obvious that the mixture may also contain other substances.

If a redox system is used as catalyst, the reducing component of the redox system, for example, a tertiary amine, is added to the pasty mixture. The mixture may in certain circumstances also contain small quantities of a polyphenol, for example, hydroquinone, for stabilising purposes.

As the catalyst which is to be mixed with the binding agent only at the place of application, it is possible with good results to use a compound which, like benzoyl peroxide for example, contains active oxygen. The application of the catalyst is facilitated by using it as a solution or suspension, in certain cases in a plasticiser for the binding agent. In order to impart the required consistency to this solution or suspension, it is advantageous for the said solution or suspension to have added thereto thickening substances, such as for example, finely divided silicon dioxide, which has been produced pyrogenically.

In order to carry the process into effect, it is expedient to employ a spray gun which has two containers for accommodating the substances or mixtures of substances which are to be applied. A supply duct may lead from each of these containers to a common spraying nozzle, the said supply ducts expediently having adjustable means with which it is possible to regulate the flow velocity. In this way, it is possible to adjust the required proportions of the substances or mixtures of substances which are to be sprayed on. Such a spray gun may be so constructed that upon stopping the spraying operation, the ducts from the containers are successively closed with a specified time interval. In this manner, the result is obtained that when the spraying ceases, no hardening mixtures are present in the common duct which would cause a clogging of the duct and of the nozzle.

Such a spray gun may also be constructed with each container connected to a separate spray nozzle, the said nozzles being arranged to converge so that the mixture to be sprayed impinges at a point at the place of application.

It has proved to be advantageous, for example, when bonding articles together, for the binder, on the one hand, and the solution or suspension of the catalyst, on the other hand, to be applied from tubes to the place of application.

The tube openings may be of such dimensions that a predetermined length of the issuing ribbon of binder and a predetermined length of the issuing catalyst mixture correspond to the optimum mixing ratio of the two constituents.

*Example 1*

A two-component system for bonding brass had the following composition in accordance with the invention:

(a) 84 parts by weight of polystyrene are dissolved in 100 parts by volume of a mixture of 77% of styrene, 9% of maleic acid-glycol polyester, 8% of acrylic acid, 4% of diethanol-p-toluidine and 2% of acetyl acetone and the total mixture is stabilised with 0.1% by weight of hydroquinone.

(b) 5 parts by weight of benzoyl peroxide and 84 parts by weight of polystyrene are dissolved in 100 parts by volume of a mixture of 89% of styrene, 9% of maleic acid-glycol polyester and 2% of acetyl acetone and the total mixture is stabilised with 0.2% by weight of hydroquinone.

One of the surfaces to be bonded is coated with the component (a) and the other with component (b) and then the two surfaces are pressed one against the other with moderate pressure. The initial adhesion is already so great that the two parts even without applied pressure do not slip off one another: The bonding readily takes place at room temperature; a strength sufficient for these purposes is already obtained after about half an hour.

*Example 2*

A two-component system according to the invention for bonding bronze has the following composition:

(a) 84 parts by weight of polystyrene are dissolve in 100 parts by volume of a mixture of 79% of styrene, 9% of maleic acid-glycol polyester, 8% acrylic acid and 4% of diethanol-p-toluidine, and the total mixture is stabilised with 0.01% by weight of hydroquinone.

(b) 5 parts by weight of benzoyl peroxide and 84 parts by weight of polystyrene are dissolved in 100 parts by volume of a mixture of 91% of styrene and 9% of maleic acid-glycol polyester and the total mixture is stabilised with 0.2% by weight of hydroquinone.

One of the articles which are to be bonded together is coated with the component (a) and the other with (b), and then the surfaces to be bonded are pressed one against the other with moderate pressure. The initial adhesion is already so great that, for example, two plates even without applied pressure do not slip off one another. The bonding readily takes place at room temperature and an adhesion sufficient for many purposes is obtained after only about half an hour.

*Example 3*

A cementing mass according to the invention is composed of the following two components:

(a) 81 parts by volume of styrene, 12 parts by volume of maleic acid-glycol polyester, 4 parts by volume of acrylic acid and 3 parts by volume of diethanol-p-toluidine are mixed and the liquid is stabilised with 0.1% of hydroquinone.

(b) 64 parts by weight of fine polystyrene bead material, 33 parts by weight of quartz powder, 3 parts of hydroxy-quinoline and 3 parts by weight of benzoyl-peroxide are mixed.

To prepare the mass for application, about 2 parts by volume of the powder (b) are stirred into one part by volume of the liquid (a). The mass can then easily be worked up in 5 to 10 minutes and solidified a short time afterwards to form an exceptionally strongly adhering mass with good mechanical properties.

Example 4

A mixture of 85 parts of monostyrene, 84 parts of polystyrene, 9 parts of maleic acid-glycol polyester, 8 parts of acrylic acid, 4 parts of diethanol-p-toluidine, 4 parts of acetyl acetone and 2 parts of hydroquinone is applied from a tube in the form of a ribbon on to a copper plate. Another ribbon consisting of 5 parts of dioctyl phthalate, 6 parts of benzoyl peroxide and 0.3 part of pyrogenically prepared silicon dioxide is laid on the first ribbon from another tube, the said second ribbon being of the same length, but thinner. The two masses are quickly mixed with a spatula and spread on the plate. A second plate is placed thereon and hardening allowed to take place at room temperature.

After 30 minutes, a very firm bonding of the two plates is obtained, the adhesive being completely hardened after 6 hours.

The foregoing examples are in no way restrictive; they are only mentioned for illustration.

What we claim is:

1. A method of adhering a self-hardening polymerizable coating composition to a metallic surface selected from the group consisting of copper, zinc, copper alloys and zinc alloys which comprises applying to said surface a self-hardening polymerizable coating composition containing at least one liquid polymerizable organic compound containing a terminal $CH_2=C<$ group and a relatively small but effective amount of at least one compound capable of forming a complex with copper and zinc selected from the group consisting of hydroxy quinoline, acetyl acetone and benzoyl acetone to improved the bond of the coating composition to said metallic surface.

2. The method of claim 1 in which said self-hardening polymerizable coating composition contains at least one liquid monomeric polymerizable compound containing a terminal $CH_2=C<$ group and at least one partially to wholly polymerized compound containing a terminal $CH_2=C<$ group.

3. The method of claim 1 in which said self-hardening polymerizable coating composition contains at least one liquid monomeric polymerizable compound containing a terminal $CH_2=C<$ group, at least one partially to wholly polymerized compound containing a terminal $CH_2=C<$ group and a catalytically reacting redox system containing a substance selected from the group consisting of tertiary amines, $\alpha$-amino sulphone and $\alpha$-hydroxy sulphone.

4. The method of claim 1 in which said self-hardening composition contains at least one liquid compound with a terminal $—CH=CH_2$ group.

5. The method of claim 1 in which said self-hardening composition contains monomeric styrene.

6. The method of claim 1 in which said self-hardening composition contains at least one liquid monomeric polymerizable compound containing a terminal $CH_2=C<$ group and polystyrene.

7. The method of claim 1 in which said self-hardening composition contains at least one $\alpha$-$\beta$-unsaturated polyester resin.

8. The method of claim 1 in which said self-hardening composition contains maleic acid anhydride.

9. The method of claim 1 in which said self-hardening composition contains an acrylic acid.

10. The method of claim 1 in which said self-hardening composition contains an acrylic acid amide.

11. The method of claim 1 in which said self-hardening composition contains an acrylic acid alkyl ester.

12. The method of claim 1 in which said self-hardening composition contains an internal plasticizer.

13. The method of claim 1 in which said self-hardening composition contains decanol vinyl ether as an internal plasticizer.

14. The method of claim 1 in which said self-hardening composition contains a higher ester of an acrylic acid as an internal plasticizer.

15. The method of claim 1 in which said self-hardening composition contains an organic compound containing at least two unsaturated aliphatic double bonds as a cross-linking agent.

16. The method of claim 1 in which said self-hardening composition contains divinyl benzene as a cross-linking agent.

17. The method of claim 1 in which said self-hardening composition contains a catalytically reacting redox system containing a peroxide as oxidizing component and a substance selected from the group consisting of tertiary amines, $\alpha$-amino sulphone and $\alpha$-hydroxy sulphone as a reducing component.

18. The method of claim 1 in which said self-hardening composition contains a catalytically reacting redox system containing benzoyl peroxide as oxidizing component and a substance selected from the group consisting of tertiary amines, $\alpha$-amino sulphone and $\alpha$-hydroxy sulphone as a reducing component.

19. The method of claim 1 in which said self-hardening composition contains a catalytically reacting redox system containing a substance selected from the group consisting of tertiary amines, $\alpha$-amino sulphone and $\alpha$-hydroxy sulphone and at least one compound with a labile halogen atom as a catalysation accelerator.

20. The method of claim 1 in which said self-hardening composition contains a catalytically reacting redox system containing a substance selected from the group consisting of tertiary amines, $\alpha$-amino sulphone and $\alpha$-hydroxy sulphone and an aliphatic alcohol as a catalysation accelerator.

21. The method of claim 1 in which said self-hardening composition contains a catalytically reacting redox system containing a substance selected from the group consisting of tertiary amines, $\alpha$-amino sulphone and $\alpha$-hydroxy sulphone and a heavy metal salt as a catalysation accelerator.

References Cited in the file of this patent

UNITED STATES PATENTS

| Number | Name | Date |
|---|---|---|
| 2,174,912 | Theilking | Oct. 3, 1939 |
| 2,335,116 | Hansen | Nov. 23, 1943 |
| 2,406,453 | Charlton | Aug. 27, 1946 |
| 2,406,454 | Charlton | Aug. 27, 1946 |
| 2,427,196 | Cox | Sept. 9, 1947 |
| 2,450,503 | Drummond | Oct. 5, 1948 |
| 2,464,568 | Flynn | Mar. 15, 1949 |
| 2,631,138 | Dannenberg | Mar. 19, 1953 |
| 2,643,243 | Dannenberg | June 23, 1953 |
| 2,686,739 | Kohl | Aug. 17, 1954 |
| 2,702,798 | Burleigh et al. | Feb. 22, 1955 |

FOREIGN PATENTS

| Number | Country | Date |
|---|---|---|
| 511,423 | Belgium | May 31, 1952 |